Oct. 13, 1936. C. H. CLARK ET AL 2,057,555
OVERHEAD DOOR FOR CLOSED VEHICLE BODIES
Filed April 3, 1935 2 Sheets-Sheet 2
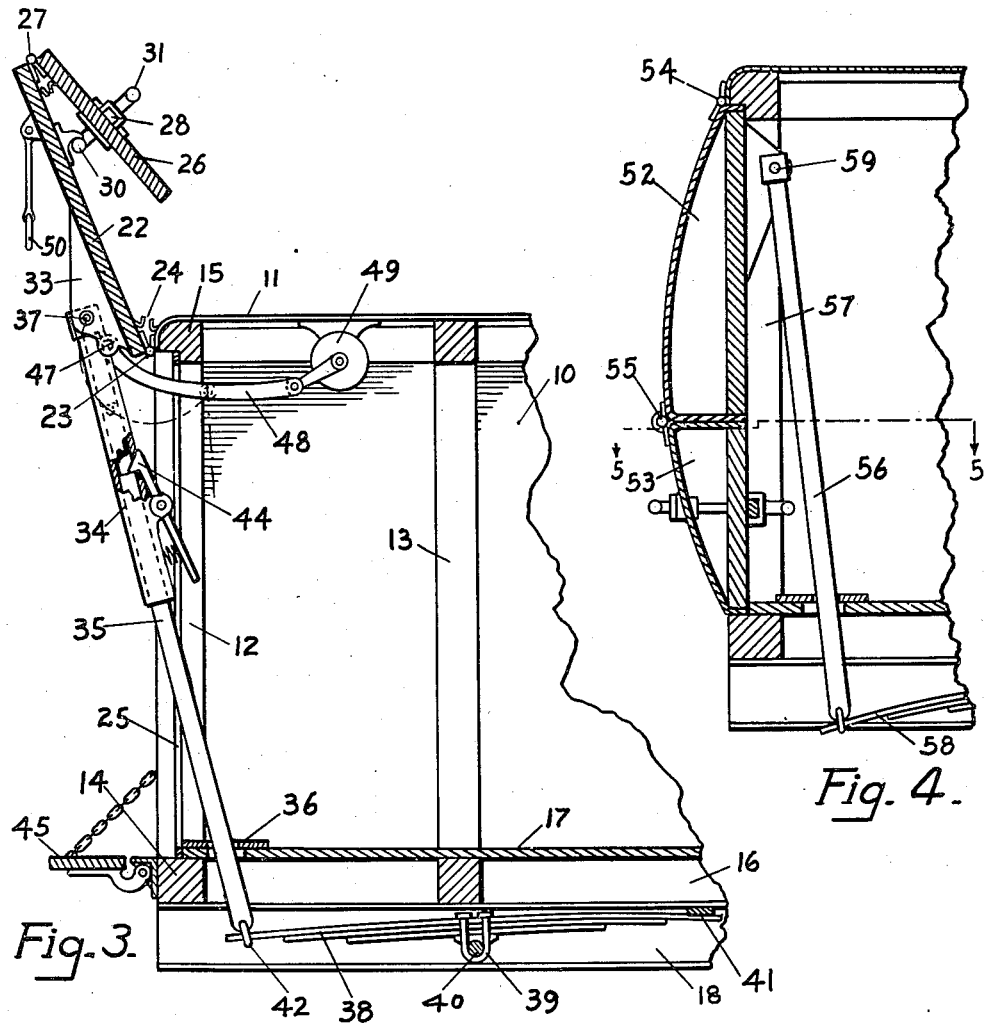
Fig. 3.
Fig. 4.
Fig. 5.
INVENTORS:
CHARLES H. CLARK
ROBERT C. HOLLISTER.
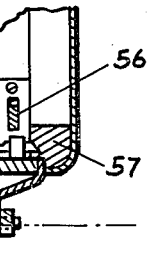
ATTORNEY.

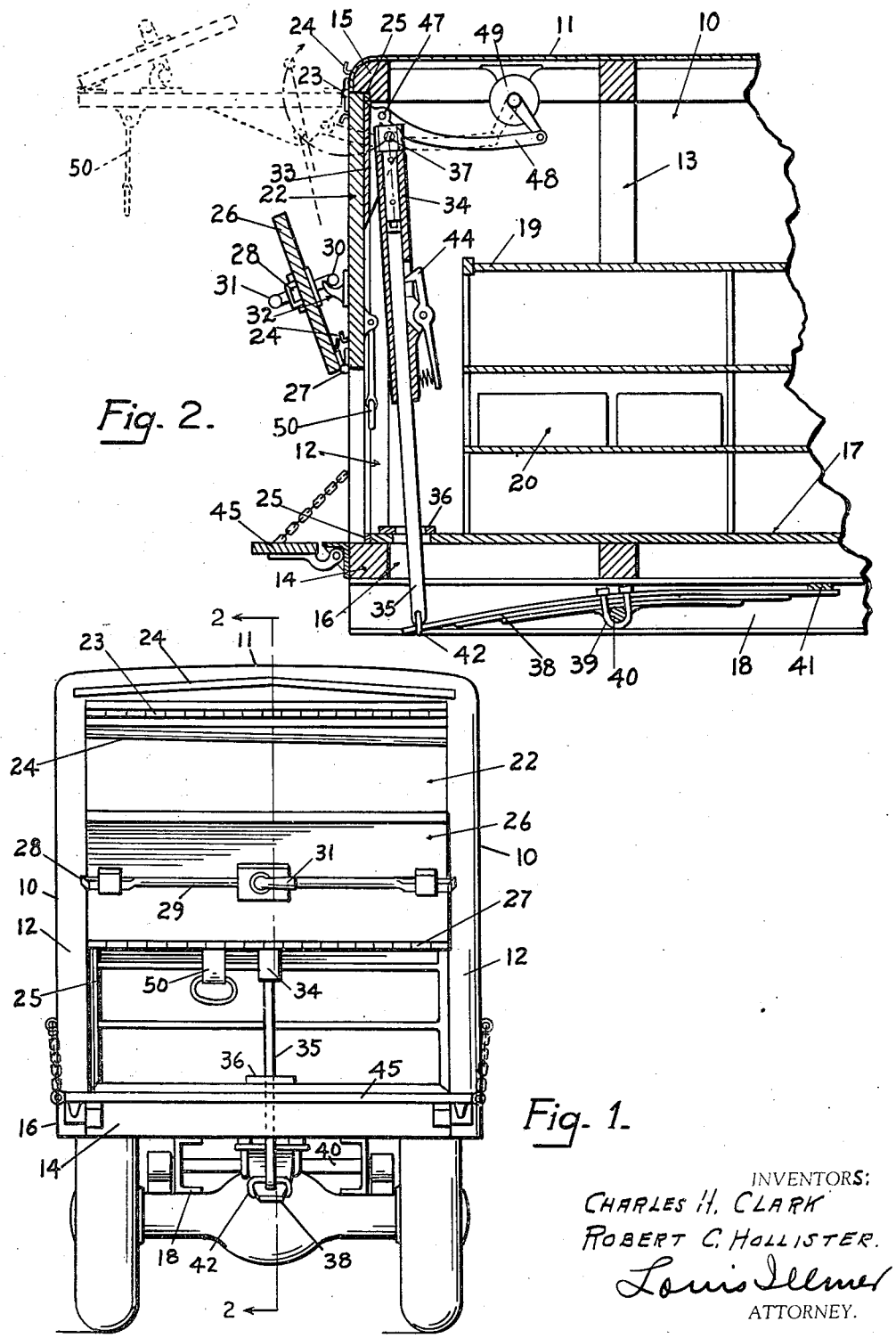

Patented Oct. 13, 1936

2,057,555

UNITED STATES PATENT OFFICE 2,057,555

OVERHEAD DOOR FOR CLOSED VEHICLE BODIES

Charles H. Clark and Robert C. Hollister, Cortland, N. Y.

Application April 3, 1935, Serial No. 14,507

12 Claims. (Cl. 296—106)

Our invention pertains to an overhead door, particularly as applied to the rear of an automotive van or similar closed vehicle body, although certain of its underlying more novel working principles find application to other purposes such as garage doors or the like.

The present disclosure will primarily be directed to a tail component of such body structure and which door commands the entrance or exit to the van interior. Our sectionalized door may be of the so-called jackknife construction having its upper marginal edge carried by master hinges attached to the transverse header or deck beam that defines the top of the doorway. Said tail end door preferably comprises a pair of hinged panels of which the lower element is adapted to fold outwardly away from the door jamb and into collapsed relation over the exterior surface of the upper panel. When closed, its own suspended weight safely retains this overhead vehicle door against inadvertent opening while traveling rapidly in congested traffic.

A suitable counterbalancing gear or actuated toggle linkage including an extensible control bar, facilitates swinging the door panels into three critical positions with respect to the master hinges, namely: (a) closed or depending position, (b) horizontal or outrigger position, and (c) erect or upturned position. Said bar is spring controlled and serves to press the closed door snugly against weather strips located along the jambs. The present style of van door is purposely disposed to swing overhead and beyond the bottom of the deck beam to afford the maximum of clear head room thereunder. Furthermore, our swinging overhead door may be opened or closed without interference after the van interior has been fully loaded.

Such massive overhead door is naturally somewhat unwieldy to handle except when counterbalanced and this requires a correspondingly powerful actuating spring. In order to prevent encroaching upon the otherwise loadable van space, we preferably locate such spring means beneath the vehicle floor and extend one end of a door lifting bar downward through the floor into cooperative engagement with said spring.

Our lifting gear may be arranged to more than counterbalance the door so as to impart a self-raising movement thereto between closed and outrigger positions. In the latter position, the partially raised door affords an overhanging roof or canopy having a collapsed outward projection less than the height of the doorway under which to protectively load or unload the van from the ground level during inclement weather. When loaded from a platform on a level with the van floor, said door may also be further raised to provide for unobstructed access into the doorway and thereby procure a clear contiguous gangway along the platform that shall be kept free from any overhead barrier likely to interfere with a speedy loading of the opened van.

Said lifting gear is disposed to permit the respective door sections to be freely opened subsequent to backing the rear of a van against such loading platform. It is further pointed out that the present toggle gear means are designed to selectively retain the collapsed door sections in either of two different elevations by the use of a single counterbalancing agency adapted to simultaneously actuate both door sections in unison. This relatively bulky agency is purposely located out of the way exteriorly of the body inclosure and preferably supported by the chassis underneath the floor level; only the slender toggle linkage members are interiorly interposed between the body sidewalls and protectively concealed behind the door, when closed. Furthermore, when raising a pair of collapsed sectional panels in the manner herein practiced, their combined center of gravity is kept contiguous to the hinge pintle with the minimum of overhung load, which in turn materially reduces the counterbalancing lift requirement in outrigger position.

Another advantage afforded by our overhead body door, resides in the small clearance room that is allowable between a row of compactly parked vans when backed up and docked along a common platform for simultaneous loading, that is to say, the overall body width alone controls the required lateral spacing needed between next adjacent vans. This aspect assumes importance when a large fleet of delivery vans or other closed truck bodies such as are daily used by bakeries, department stores or other industrial pursuits, must be expeditiously handled along a relatively short platform length at a loading terminal located in crowded urban quarters.

As a further advantage aiming to reduce repairs and maintenance costs, our opened overhead door does not extend outwardly beyond the body sides into the path of passing traffic when the van is parked alongside a highway shoulder or street curb for the delivery of goods, nor is such door likely to be blown shut or torn off its hinges by a heavy gust of wind since the present door is positively retained in both open and closed positions.

Because the rear corner posts are not subjected to any door hinge cocking moment, such uprights need not be reenforced in profile size with respect to the next adjacent upright rib of the latticed framework. Hence, the maximum of clear doorway is obtainable for a given overall body width dimension. The resulting greater spread between the rear corner posts offers a decided advantage in loading certain larger household goods or the like such as are commonly transported in moving vans.

A van of this kind may also be overhangingly loaded beyond its lowered tail board and under the cover of our partially raised overhead door. In such overhead van doors, our demountable lifting bar is preferably arranged in duplicate alongside the respective jambs; if necessary, these bars may be temporarily removed to enlarge the available side clearance space of the rear doorway.

The primary object of our invention is to provide for manipulative overhead door devices of the character indicated and that can readily be incorporated into a vehicle body, garage or other doorway at moderate first cost without requiring extensive changes in the prevailing housing structure or seriously encroaching upon the doorway clearance. Disclosed herein are also other features of organization which facilitate the manufacture and adapt such door improvements to the needs of fleet owners, including the provision of a stream-lined surface contour for the rear door end of a high-speed closed vehicle body, all of which will hereinafter be more explicitly set forth. Reference is had to the accompanying two sheets of drawings which are illustrative of certain embodiments of our devices, and in which:

Fig. 1 represents an elevational rear end view of a vehicle body equipped with a sectional overhead door of which the upper panel is closed with the lower panel folded upwardly thereon.

Fig. 2 is a cross-sectional view taken along line 2—2 of Fig. 1, and Fig. 3 shows a similar view with the collapsed panels raised into erected position.

Fig. 4 depicts an alternative overhead door structure in which the tail end of a van or the like closed vehicle body is given a stream-lined configuration, and Fig. 5 is a cross-section thereof taken along line 5—5.

Referring now in detail to Figs. 1 to 3, this disclosure is representative of a closed van body, preferably comprising a pair of metal sheathed side walls 10 and a transverse top wall 11. Such sheaths may be mounted upon a body framework comprising spaced rear corner posts or door jambs 12 that are shown rabbeted to constitute an inset door ledge. It is emphasized that no hinges are attached to either jamb and that they may be kept identical in profile thickness with the adjacent upright side ribs such as 13 of the latticed body framework. Cross members such as the rear sill 14 and the header or deck beam 15, may be similarly rabbeted to provide for a flush endless ledge that circumscribes the doorway in an inset relation to the tail end of the van body. Our door is hinged to evenly abut said inset jamb ledge so as to provide for a neat exterior trim in which the exposed door surface shall fall in flush alignment with the tail end of the van. The body framework may further include the usual side sills such as 16 mounting a floor board 17 and which sills may rest in a conventional manner upon a pair of automotive chassis channels 18. For certain delivery purposes, such enclosed body may be interiorly equipped with storage racks or other skeleton shelving 19 adapted to stack the individual trays 20 thereon containing loaves of bread or the like commodities.

Our sectional door is shown provided with a rigid flat upper panel 22 of which a marginal edge may be pivotally attached to the deck beam 15 by a continuous piano or other type of master hinge 23. Drip mouldings or drain strips such as 24 may be applied both above and below said hinge to weatherproof the topmost panel joint in all door positions. For a similar reason, a weather strip 25 as fashioned from sponge rubber or the like yieldable material, may be seated around the endless jamb ledge of our doorway in which the rear sill is here given a rabbeted formation by raising the transverse end of the floor board 17.

The lower panel 26 may in turn, be hinged to the transverse free edge of the upper panel in such manner that this lower winglike panel may be swung outwardly away from its door jamb about the secondary hinges 27 into the collapsed Fig. 2 position. The interior face of the wing panel 26 is preferably provided with a door locking mechanism comprising a pair of latch tongues 28 that are oppositely retractible through latch rods such as 29 of which the respective innermost ends are simultaneously actuated through a common exteriorly disposed lever handle 30 of which the trunnion extends through the last named panel. Such trunnion may also be provided with a similar lever grip 31 located behind the closed door panel so as to be selectively operated by either lever. The exterior face of the upper panel may be provided with a catch 32 of the hook type adapted to retain the collapsed lower panel by gripping the handle 30, as shown. Such handle may be conveniently released by turning the exposed lever 31; upon fully closing the sectional door, the tongues 28 are respectively intended to engage a continuous corner post when they may be locked in place.

Our overhead door is designed to be swung upwardly away from both its jambs about the master hinge 23 into either the outrigger or erect positions as respectively represented in Figs. 2 and 3. To facilitate the lifting of such door, the interior face of the upper panel 22 carries an outstanding fulcrum bracket 33 of which the removable pivot pin is designated 37. Cooperatively thrusting upwardly against this pin is an extensible control bar disposed interiorly of the body confines and which bar may comprise a tubular socket or sleeve section 34 having one end of the telescopic rod 35 entered therein. The lower rod extremity preferably extends beneath the floor level and may be guided through the slotted floor plate 36.

The required relatively heavy counterbalancing thrust may be exerted lengthwise of said rod by a correspondingly massive laminated leaf spring or other supplementary thrust applying agency 38. Said spring may be mounted intermediate its ends by the clip 39 and pivotally supported upon a channel cross rod 40. The forward spring end rests against the stop bar 41 or the like abutment, while the rearward spring end operatively engages the lower extremity of the rod 35 through the shackle 42. The upper extremity of the tubular section 34 may have an apertured stub end mounted therein to receive the bracket pin 37 therethrough. The depending shank of such stub end is intended to be tightly secured into place as a retaining plug against which the upper end of the rod 35 may abut to fix the contracted length of the extensible control bar. Said section 34 may further be slotted intermediate its ends and have mounted thereon a spring loaded trip lever or the like bar retaining means of which the detent or pawl 44 may be entered through said slot to normally ride upon the rod surface as in Fig. 2. When the telescopic rod 35 is partially withdrawn with respect to the section 34, the trip lever spring urges said pawl radially inward into latched engagement behind the upper rod terminal in the manner indicated in Fig. 3 to fix the extended length of the control bar and thereby uphold the collapsed door in its fully raised position.

If desired, the rear sill 14 of our doorway may be provided with a tail board 45 which is shown upheld in its extended position by the usual chains. When folded into its upright position, said board serves as a supplementary securement against inadvertent opening of the lower panel 26. As a further optional refinement, the bracket 33 may carry an additional pivot pin 47 which has one end of a crooked link 48 attached thereto. The opposite link end may be operatively connected to a hydraulic shock absorber or the like door check means 49 of any suitable type, whose purpose is to automatically interpose a restraining influence in the event the door should tend to slam or otherwise assume an unduly rapid travel during its descent toward the jambs. It is preferred to bring about a more intensive cushioning effect just prior to seating the lowered door against its jambs. A pull strap 50 of the pendant type may be pivotally attached to the interior surface of the upper panel to facilitate the manipulation of the overhead door into its several operative positions, particularly when raised.

Having described the structural aspects of our overhead door in detail, the functional operation thereof may be traced as follows:

Referring to Fig. 2, it will be observed that the pintle of the master hinge 23 together with the pivot point 37 and the lower extremity of the rod 35, constitute a toggle linkage. In such toggle joint, one link length is formed between the axis of said hinge pintle and the bracket pivot 37, while the mated link is found in the control bar. The free end of the leaf spring 38 is therefore depressed whenever the intermediate toggle point 37 passes into or out of alignment with respect to the pintle axis and said rod end. Upon door closure, the upward spring tension acting along the control bar exerts a turning moment about the pintle of the master hinge that snugly seats the door against the circumscribing weather strip 25. The handle of the depending pull strap 50 then lies flatwise against the door interior as in Fig. 2 without encroaching upon the van load.

After releasing the latch 28 by turning the handle 30, the lower panel 26 may be freely collapsed upwardly on the upper panel 22, whereupon said lever handle 30 may be thrown into engagement with the catch 32. By the use of said pull strap, the collapsed panels may be drawn outwardly and upwardly about the master hinge pintle, which in turn passes the pin 37 through its aligned toggle position. Thereupon the upward spring thrust exerted lengthwise of the counterbalancing rod 35, causes the several panels to be automatically lifted into outrigger position that is shown in dotted outline in Fig. 2. The open door is then positively retained by the actuating gear. At that time, the pull strap 50 is placed in convenient reach of the attendant by which to reverse the door movement thus depressing the lower end of the rod 35 and restoring energy in the spring 38 for a subsequent door lift. It will be obvious that the initial tension of this spring can readily be adjusted to suit requirements, also that such resilient follow up thrust need not necessarily fully counterbalance the whole of the lifted door weight. As the spring tension becomes partially spent, its point of application about the master hinge may be correspondingly enlarged as in Fig. 3 and thereby maintain a substantially uniform self-lifting effort on part of the door control bar.

As a further alternative, said door may also be manually raised into the full-lined erected position. In Fig. 3 the link 48 is now drawn into its extreme leftward swing position and the check device 49 made to operate in unison with the door movements. When the door is fully raised, the control bar sleeve 34 will slide upwardly upon the lifting rod 35 until the pawl 44 drops behind the upper rod end, which then allows the counterbalancing spring 38 to again uphold the erected door in a different position until such time that the trip lever is released. A single control bar device is herein made to serve as a combined actuating and counterbalancing gear means adapted to sustain our door in alternative raised positions. The present gear is wholly free from sway with a change in the rate of vehicle travel and is free from guide rails or suspended cable weights such as usually form part of a conventional overhead door assembly. The closed door is kept free from rattle because of the spring tension that is exerted upon the door jambs. A single overhead door panel that likewise opens outwardly away from its jambs may also be resorted to for certain purposes.

When transporting perishable products that may be seriously damaged when exposed to extremely cold weather, the intrinsic body heat need not be wastefully dissipated. In the case of making a delivery of warm baked goods or the like, our lower door panel 26 alone may be partially raised to remove the bottom trays without requiring the raising of the upper panel; the opening of the panel 22 would allow a far larger volume of warmed air to escape from the van interior. At the same time, when the secondary hinge 27 is raised into its upturned position as in Fig. 3, the panel height is still kept relatively low.

Figs. 4 and 5 disclose a cross-sectionally dished or stream-lined contour surface as applied to the rear door of a van to reduce the tractional resistance while running at high speeds. The door is again given a jackknife formation comprising metal sheathed, hollow upper and lower panel sections 52 and 53 which are likewise suspended from the deck beam by the master hinges 54. Because of the bumped spheroidal character of the rearmost wall sheath of this door relative to its flat jamb contacting face, it is preferred to resort to a series of separated coach type of hinges such as 55 that pivotally interconnect the panel sections, the pintles of such secondary hinges being placed in axial alignment as shown.

A pair of duplicate control bars such as 56 are here used and these are respectively placed closely adjacent to their corner posts 57. In this instance, said bars are not made telescopic and the associated lifting springs 58 may be individually disposed directly beneath the lower bar ends rather than in the centralized location indicated in Fig. 1. The demountable bracket pin 59 allows one or both of the control bars to be removed in the event the maximum of side clearance space should be needed for loading purposes. By virtue of the relatively thin corner posts allowed when suspending the door from an overhead deck beam, such structure affords an inherently wide entrance for a corresponding overall van dimension.

The intended manipulative function of the Fig. 4 rear door, is essentially similar to that described in connection with the flat door panels 22 and 26. It is thought the foregoing disclosure will make evident to those skilled in this art, the advantages afforded by our improved overhead door, it being understood that we reserve the right to incorporate equivalent door actuating means in any of our illustrative embodiments, all without departing from the spirit and scope of our invention heretofore described and more particularly point out in the appended claims.

We claim:

1. A vehicle body of the enclosed type provided with a floor and a doorway including complementary jambs and a bridging deck beam, an overhead door closing the doorway and having a marginal edge pivotally suspended on the deck beam to allow said door to swing outwardly away from both jambs into a raised position, control bar means of which one end region is pivotally attached to the interior surface of the door and the other bar end region extends downwardly through the body floor, and door counterbalancing means located beneath the floor level and thrusting upwardly against the aforesaid other bar end.

2. A vehicle body of the inclosed type provided with a doorway including complementary jambs and a transversely disposed deck beam, an overhead door closing said doorway and having a marginal edge hingedly suspended on the deck beam to allow of swinging the door outwardly away from said jambs into a raised position, door actuating gear means including a pair of toggle links of which one such link is extensible and pivotally adjoined to the interior face of the door, counterbalancing means imposing a thrust through said one link, the toggle links being arranged to provide for a thrust component upon the door toward said jambs when the door is closed thereon and which links also serve to uphold the door weight when the door is swung into two different raised positions of which one such position is elevated above the other, and retaining means selectively fixing the length of the extensible bar in each such door position.

3. A vehicle body of the inclosed type provided with a floor and a rear doorway including complementary jambs and a transversely disposed deck beam, a sectionalized overhead door closing said doorway and comprising pivotally interconnected upper and lower panels of which the lower panel is collapsible upon the exterior surface of the upper panel, said door having a free marginal panel edge hingedly suspended on the deck beam to allow of swinging the collapsed panels outwardly away from both of said jambs, a door actuating gear including a pair of toggle links of which one such link has an end region operatively adjoined to the interior face of the upper door panel, and thrust means imposing a guided counterbalancing lift upon the opposite end region of said one link and which thrust means are located beneath the floor level, the pivot joint between said links being arranged to fall into toggle alignment intermediate the respective remote link ends when the door is swung outwardly away from its closed position.

4. A vehicle body of the inclosed type provided with a doorway including complementary jambs and a transversely disposed deck beam, a sectionalized overhead door closing said doorway and comprising pivotally interconnected upper and lower panels of which the lower panel is collapsible upon the exterior surface of the upper panel, said door having a free marginal panel edge hingedly suspended on the deck beam to allow of swinging the collapsed panels outwardly away from said jambs into outrigger position and also into another relatively elevated position, extensible control bar means having one end region pivotally attached to the upper panel and the other bar end depending from such pivotal attachment, and pressure applying means imposing a counterbalancing lifting thrust upon said bar means to raise the door into outrigger position and which door is likewise counterbalanced when further raised into the aforesaid another elevated position.

5. In combination with a doorway including complementary vertical jambs and a transversely disposed deck beam, an overhead door closing against said jambs and having a marginal edge pivotally suspended on the deck beam to allow the door to swing outwardly away from the door jambs into horizontal and into erected positions, a toggle linkage including an extensible bar of which one end region is operatively attached to the interior face of said door to move in unison therewith and the opposite bar end region is guided, pressure applying means imposing a lifting thrust lengthwise of the bar at its guided end region to counterbalance the raised door in its horizontal position when the bar is contracted and which means also counterbalances the door in its erected position when the bar is extended, and retaining means for fixing the requisite length of the extensible bar in either of such door positions.

6. In combination with a doorway including complementary vertical jambs and a transversely disposed deck beam, an overhead door closing against said jambs and having a marginal edge pivotally suspended on the deck beam to allow the door to swing outwardly away from the door jambs into horizontal and into erected positions, a toggle linkage including an extensible bar of which one end region is operatively attached to the interior face of said door and the opposite end region is guided, pressure applying means imposing a lifting thrust lengthwise of the bar at its guided end region to counterbalance the raised door in its horizontal position when the bar is contracted and which pressure applying means also counterbalances the door in its erected position when the bar is extended, and latch means serving to releasably retain the extended bar.

7. A vehicle body of the enclosed type provided with a doorway including complementary jambs and a transversely disposed deck beam, an overhead door closing said doorway and having a marginal edge hingedly suspended on the deck beam to allow of swinging the door outwardly away from its jambs into a raised position, a fulcrum pin bracketed to the interior face of said door, a control bar having one end pivotally mounted upon the fulcrum pin and the other bar end guided to constitute a toggle linkage with respect to the axis of the hinge pintle, said pin being disposed to travel in unison with the door movements into and out of aligned toggle position lying intermediate the pintle axis and the guided end of said bar, and resilient means located exteriorly of the body inclosure and operatively connected to exert a lifting thrust lengthwise of the bar and which means has energy stored therein when the fulcrum pin approaches toward its aligned toggle position and restores such energy through the bar when said pin recedes from said aligned position.

8. A vehicle body of the enclosed type provided with a doorway including a transversely disposed deck beam, an overhead door closing said doorway and having a marginal edge hingedly suspended on the deck beam to allow of swinging the closed door outwardly into raised position, said door comprising a pair of pivotally interconnected panels of which the lower panel is collapsible over the exterior face of the upper panel, a latch mechanism carried upon the interior face of the closed lower panel and equipped with an actuating trunnion extending through the lower panel, mated handles respectively disposed upon opposite side faces of the last named panel for selectively operating said trunnion, a catch device mounted upon the exterior face of the closed upper panel arranged to retain one of said handles, and toggle linkage means including counterbalancing pressure applying means serving to actuate the collapsed panels while said one handle is retained by the catch device.

9. A vehicle body of the enclosed type provided with a doorway including complementary jambs and a transversely disposed deck beam, a sectionalized overhead door closing said doorway and comprising pivotally interconnected upper and lower panels of which the lower panel is collapsible upon the exterior surface of the upper panel, said door having a free marginal panel edge hingedly suspended on the deck beam to allow of swinging the door outwardly away from said jambs into outrigger position, extensible control bar means of which one end region is pivotally attached to the interior face of the upper panel to move in unison therewith and the other end region of which bar is guided to constitute a toggle linkage with respect to the pintle axis of the door hinge, pressure applying means exerting a counterbalancing thrust upon said guided bar end region, and a pull strap of the pendant type also attached to the aforesaid interior face of the upper door panel.

10. In a doorway including a pair of complementary jambs together with a transversely disposed deck beam and a sill that are respectively rabbeted to constitute an exteriorly inset ledge that circumscribes the doorway, the combination of an overhead door having a marginal edge pivotally suspended from the deck beam to allow the door to close against said ledge and to swing exteriorly outward therefrom to substantially clear the doorway beneath the deck beam, a combined actuating and counterbalancing gear including toggle bar means and which gear is arranged to substantially counterbalance the door weight when swung away from said ledge by said gear into a certain raised position, and means for extending the length of the bar means to further elevate the door with respect to such certain position and for releasably retaining the bar means when extended.

11. A vehicle body of the inclosed van type supported upon a chassis and which body is provided with a rear doorway including complementary jambs and a transversely disposed deck beam, an overhead door hingedly suspended from the deck beam to swing outwardly away from said jambs, a door counterbalancing agency located exteriorly of the body inclosure, and a toggle linkage operatively interposed between the interior face of the door and the counterbalancing agency and which linkage is actuated by said agency to swing the door outwardly.

12. In a vehicle body of the enclosed type supported upon a chassis and provided with a floor board together with a doorway including complementary jambs and a bridging deck beam, the combination of an overhead door closing the doorway and having a marginal edge pivotally suspended to the deck beam and allowing said door to swing outwardly away from both jambs into raised outrigger position, a control bar of which one end region is pivotally attached to the interior surface of the door and the other bar end region extends downwardly through the body floor, cross bar means extending between the chassis channels, and a leaf spring located beneath said floor, the medial region of said spring being transversely supported by the cross bar means and having a rearwardly located spring end operatively attached to the aforesaid other bar end region.

CHARLES H. CLARK.
ROBERT C. HOLLISTER.